United States Patent
Körte

(10) Patent No.: US 6,210,448 B1
(45) Date of Patent: Apr. 3, 2001

(54) 1:2 CHROMIUM COMPLEX DYES, THE PRODUCTION AND USE THEREOF

(75) Inventor: Klaus Körte, Ettingen (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/424,493

(22) PCT Filed: May 19, 1998

(86) PCT No.: PCT/IB98/00764

§ 371 Date: Nov. 24, 1999

§ 102(e) Date: Nov. 24, 1999

(87) PCT Pub. No.: WO98/54264

PCT Pub. Date: Dec. 3, 1998

(30) Foreign Application Priority Data

May 29, 1997 (EP) .................................................. 97108652

(51) Int. Cl.⁷ ............................. C09B 45/16; C25D 11/24

(52) U.S. Cl. ..................... 8/522; 8/506; 8/685; 534/700; 534/713; 534/721; 534/724; 534/725

(58) Field of Search ................................ 8/506, 685, 522; 534/700, 713, 721, 724, 725

(56) References Cited

U.S. PATENT DOCUMENTS 5,123,930 * 6/1992 Bitterli .
5,853,431 * 12/1998 Korte .

FOREIGN PATENT DOCUMENTS

355550 * 8/1961 (CH) .
382888 * 12/1964 (CH) .
396256 * 1/1996 (CH) .

* cited by examiner

Primary Examiner—Margaret Einsmann
(74) Attorney, Agent, or Firm—Scott E. Hanf

(57) ABSTRACT

1:2 chromium complex dyes of the formula:

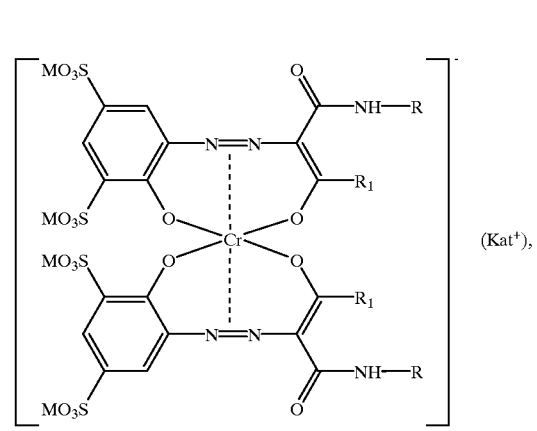

(I)

in which R signifies $C_{1-9}$-alkyl or a radical of the formula:

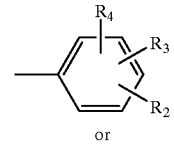

(a)

or

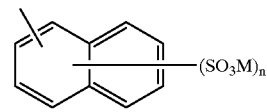

(b)

$R_1$ signifies $C_{1-4}$-alkyl, $R_2$ signifies hydrogen or —$SO_3M$, $R_3$ signifies hydrogen, methyl or methoxy, $R_4$ signifies hydrogen, methyl, methoxy or chloro, n signifies from 0 to 3, M signifies hydrogen or a non-chromophoric cation and Kat⁺ signifies hydrogen or a non-chromophoric cation, are suitable for dyeing artificially produced oxide layers on aluminium or aluminium alloys and so give rise to highly lightfast dyeings in yellow shades.

12 Claims, No Drawings

1:2 CHROMIUM COMPLEX DYES, THE PRODUCTION AND USE THEREOF

Structures, articles or parts made of aluminium or aluminium alloys and provided with a protective oxide layer, in particular an oxide layer produced electrochemically by anodization, are nowadays increasingly used in engineering and construction as, for example, a component and/or for the decoration of buildings or means of transport or for utility or artistic articles. For the aesthetic design of such structures, articles or parts they or their oxide layers are frequently dyed. It is therefore desirable for the dyed layers to retain their coloured design for as long as possible and, consequently, for them to have very high levels of fastness to environmental influences, especially to the action of sunlight.

CH-A 396256 discloses heavy-metal complexes of monoazo dyes containing phosphonic acid groups which are used, inter alia, to dye anodic oxide layers on aluminium. Example 10 of CH-A 396256 describes a yellow chromium complex of the monazo dye made from 2-aminophenol-4,6-disulphonic acid → 3-acetoacetylaminobenzenephosphonic acid.

It has now been found that the 1:2 chromium complex dyes defined below are outstandingly suitable as yellow dyes for such oxide layers, especially for anodized aluminium or anodized aluminium alloys, and are notable for their surprisingly high light fastness.

The invention relates to the defined 1:2 chromium complex dyes, to their production and to their use for dyeing oxide layers produced artificially (principally galvanically) on aluminium or aluminium alloys, and to preparations which comprise these dyes. The invention therefore firstly provides 1:2 chromium complex dyes of the formula:

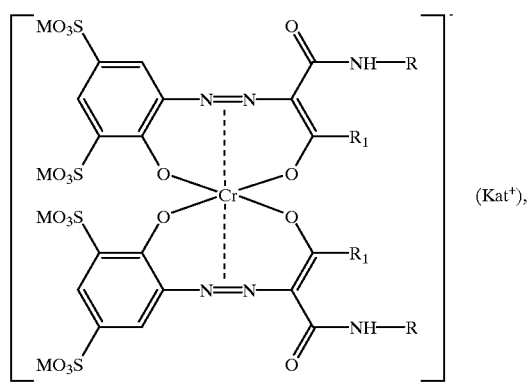

(I)

(Kat⁺), in which R signifies $C_{1-9}$-alkyl or a radical of the formula:

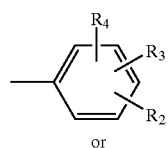

(a)

or

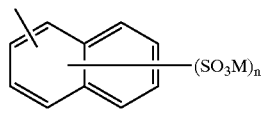

(b)

The alkyl radicals occurring in the formula (I) may be linear or, if they contain three or more carbon atoms, may also be branched, or, if they contain six or more carbon atoms, can also be cyclic.

In the definition of $R_1$ the lower-molecular alkyl radicals are preferred, in particular ethyl and above all methyl.

Among the alkyl radicals in the definition of R the branched and the cyclic are preferred, especially $C_{4-8}$-isoalkyl, secondary $C_{3-8}$-alkyl, unsubstituted cyclohexyl and cyclohexyl which carries from one to three methyl groups as substituents. According to one embodiment of the invention preferred alkyl radicals in the definition of R are those which contain at least 4 carbon atoms.

In the radicals of the formula (a) the respective substituents can be located in any desired positions on the phenyl radical; if $R_2$ is a sulpho group —$SO_3M$, this group is preferably located in meta position or para position; if $R_3$ is methyl or methoxy, and/or if $R_4$ is methyl, methoxy or chloro, these substituents can be located in any of the available positions, with preferably at least one of the two ortho positions of the phenyl radical being unsubstituted. With particular preference both $R_3$ and $R_4$ are hydrogen.

The free bond on the sulpho-substituted naphthalene radical (b) can be located arbitrarily in α or β position, the a position being preferred. For n=1 to 3 the n sulpho groups in the formula (b) can be located in n arbitrary available positions, the vicinal positions to the bond to —NH— preferably being unsubstituted. Mention may be made in particular of α-naphthyl and the following naphthylsulphonic acid radicals of the formula (b): 2-naphthyl-4,6,8-tri-sulphonic acid, 1-naphthyl-3,6-disulphonic acid, 1-naphthyl-3,7-disulphonic acid, 1-naphthyl-4,6-disulphonic acid, 1-naphthyl-4,7-disulphonic acid, 2-naphthyl-4,8-disulphonic acid, 2-naphthyl-5,7-disulphonic acid, 2-naphthyl-6,8-disulphonic acid, 1-naphthyl-3-, -4-, -5-, -6- or -7-sulphonic acid and 2-naphthyl-5- or -6-sulphonic acid. Among these radicals, preference is given to those in which n=1, especially 1-naphthyl-4- or -5-sulphonic acid.

Particular preference in the definition of R is given to isooctyl, sulphophenyl or, in particular, unsubstituted phenyl.

The sulphonic acid groups can be in the form of the free acid or, preferably, in the form of salts of non-chromophoric cations.

M and Kat⁺ can each be hydrogen or a non-chromophoric cation. Hydrogen as ion is present as the hydronium ion. Examples of suitable non-chromophoric cations are alkali metal cations, ammonium cations and alkaline earth metal cations. As alkaline earth metal cations mention may be made, for example, of calcium and magnesium. As ammonium cations mention may be made of unsubstituted ammonium or also ammonium ions of low-molecular amines, primarily mono-, di- or tri-$C_{1-2}$-alkyl- and/or -β-hydroxy-$C_{2-3}$-alkyl-ammonium, examples being mono-, di- or tri-isopropanolammonium, mono-, di- or triethanolammonium, N-methyl-N-ethanol-ammonium. Suitable alkali metal cations are customary such cations, examples being lithium, sodium and/or potassium ions. Among these cations the alkali metal cations and ammonium cations are preferred. In one embodiment of the invention some of the symbols M and Kat⁺ are hydrogen and the rest of them are alkali metal cations and/or ammonium cations.

The 1:2 chromium complex dyes of the formula (I) can be symmetrical or also asymmetrical complexes; i.e., apart from the definitions of M and Kat⁺, the two radicals R can have the same definition as or different definitions to one another, and/or the two radicals $R_1$ can have the same definition as or different definitions to one another. Preference is given to symmetrical chromium complexes of the formula (I); i.e., to those in which the two radicals R have the same definition and in which the two radicals $R_1$ also have the same definition.

The 1:2 chromium complex dyes of the formula (I) can be prepared in analogy to chromation reactions which are known per se. In particular, the process for preparing the 1:2 chromium complex dyes of the formula (I) is characterized in that at least one metallizable compound which corresponds in one of its tautomeric forms to the formula:

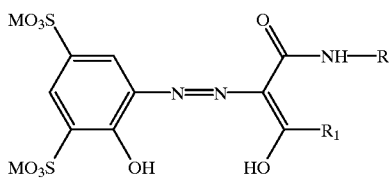

(II)

is reacted with a chromium donor compound.

The compounds of the formula (II) can be prepared by coupling the diazo compound of 2-amino-1-hydroxybenzene-4,6-disulphonic acid to a coupling component which corresponds in one of its tautomeric forms to the formula:

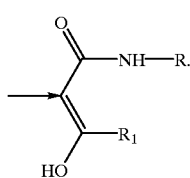

(III)

The compounds of the formula (III) are known or can be prepared in analogy to known methods by acylating an amine of the formula $R-NH_2$ with an acylacetic halide of the formula $R_1-CO-CH_2-CO-Hal$ under dehydrohalogenating conditions, for example, at pH values within the range from 3 to 8, in particular from 4 to 6, and at mild temperatures, for example, within the range from 0 to 70° C., in particular from 20 to 60° C., or, if R is aromatic, alternatively by reacting the respective arylamines with corresponding acylacetic esters of low-molecular alcohols (preferably methyl or ethyl esters) at temperatures above 100° C., or, in a preferred variant, if $R_1$, is methyl, by reacting diketene:

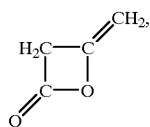

(IV)

optionally as an acetone adduct, with corresponding amines of the formula $R-NH_2$, in solution (e.g., in water or acetone) at temperatures, for example, within the range from 40° C. up to reflux.

The diazotization of 2-amino-1-hydroxybenzene-4,6-disulphonic acid can be carried out in a manner known per se, in particular with sodium nitrite in an acidic medium (preferably at a pH of 1 to 3) and at a low temperature, preferably within the range from −5 to +15° C. The coupling of the diazonium compound to a coupling component of the formula (III) can be carried out in a manner known per se, advantageously at temperatures within the range from −5 to +30° C., preferably below 25° C., and with particular preference within the range from 0 to 10° C., and under distinctly alkaline conditions, advantageously within the pH range from 8 to 12, preferably from 9 to 11. The reactions may be carried out in an aqueous medium or also in an aqueous/organic medium, the organic medium preferably being a water-miscible inert solvent (e.g., an alcohol or dioxane).

For the chromation of the compounds of the formula (II) to give corresponding 1:2 chromium complex dyes of the formula (I) it is possible to use suitable chromium compounds which are customary per se and as are employed for the preparation of chromium complexes, examples being chromium hydroxide or water-soluble salts of low-molecular carboxylic acids or mineral acids, in particular chromium trichloride, chromium trifluoride, chromic sulphate, chromic formate, chromic acetate, potassium chromium sulphate, ammonium chromium sulphate (e.g., chrome alums) and, if desired, with an addition of a reducing agent, e.g., glucose, also sodium or potassium chromate or dichromate.

Chromation can be carried out directly to the 1:2 chromium complex stage or in stages via the 1:1 chromium complex stage with subsequent complexation to the 1:2 chromium complex stage.

Chromation can be conducted in an aqueous medium, preferably at pH values within the range from 2 to 10 and at temperatures within the range from 95 to 130° C., under pressure if necessary. If desired, the reaction may be carried out with addition of organic solvents or else only in organic solvents. Suitable organic solvents are preferably those which are miscible with water and have a boiling point of more than 100° C. and in which the azo dyes and their metal salts are soluble, examples being glycols, ether alcohols or amides (e.g., ethylene glycol, polyethylene glycols, β-ethoxyethanol, β-methoxyethanol, formamide or dimethylformamide). To prepare asymmetrical 1:2 chromium complex compounds chroming can be carried out in stages by first preparing the 1:1 chromium complex of one of the complexing compounds and then preparing the 1:2 chromium complex from the first complex using a second complexing agent. The 1:1 chromium complexes can be prepared in a manner known per se, e.g. under conditions analogous to those for the 1:2 chromium complexes, but, preferably, at more strongly acidic pH values, advantageously at a pH<3. The preparation of the 1:2 chromium complexes then takes place advantageously at pH values within the range from 3 to 10, preferably from 4 to 9.

After having carried out the required coupling and metallization and, if required, salt formation or ion exchange in order to introduce cations M and/or Kat⁺, the resulting dyes or dye mixtures can be isolated from the mother liquor in a manner known per se; for example, by salting out or acidification with a strong mineral acid and filtration, or, for example, by membrane filtration of the dye solution (either of the dye solution as prepared or of the solution of the filtered dye) and, if desired, drying (e.g., by spray drying) of the dye solution, that has optionally been desalinated by membrane filtration. If desired, the dye may be blended with a customary conventional extender, for example, with non-electrolytic extenders; the dye desalinated by membrane filtration may be blended, if desired, with non-electrolytic extenders (principally urea and/or oligosaccharides, e.g., dextrins), before or after drying (e.g. spray drying). If desired, anionic surfactants, especially hydrocarbonsulphonates or other organic sulphonates, e.g., sulphonated castor oil, sulphosuccinates or ligninsulphonates, can be added to the dyes. If a surfactant is used the weight ratio of the surfactant to the pure dye is advantageously at values within the range from 2:98 to 10:90. For liquid formulations the dyes, advantageously in desalinated form and without extender additives, are produced as concentrated solutions in which the dye content lies advantageously within the range from 5 to 35 percent by weight, preferably from 10 to 25 percent by weight, based on the weight of the composition. Optionally, it is also possible to add an additive for combating the damaging effect of microorganisms (for example, an agent which kills the microorganisms, i.e., a biocide or microbicide, or which inhibits their growth, i.e., primarily a bacterial, fungal and/or yeast growth-inhibiting additive) in concentrations, for example, of from 0.001 to 1% by weight based on the overall liquid formulation.

The dyes of the formula (I), especially in the form of their salts, in particular alkali metal salts and/or ammonium salts, are highly soluble in water and, in dry form or alternatively in the form of even their concentrated solutions, are very stable on storage and transportation. They serve as anionic dyes, especially for dyeing artificially produced oxide layers on aluminium or aluminium alloys.

Aluminium alloys which come mainly into consideration are those in which the aluminium component is predominant, especially alloys with magnesium, silicon, zinc and/or copper, e.g., Al/Mg, Al/Si, Al/Mg/Si, Al/Zn/Mg, Al/Cu/Mg and Al/Zn/Mg/Cu, preferably those in which the aluminium content accounts for at least 90 percent by weight; the magnesium content is preferably $\leq 6$ percent by weight; the silicon content is preferably $\leq 6$ percent by weight; the zinc content is preferably $\leq 10$ percent by weight; the copper content is advantageously $\leq 2$ percent by weight, preferably $\leq 0.2$ percent by weight.

The oxide layers formed on the metallic aluminium or on the aluminium alloys may have been generated by chemical oxidation or, preferably, galvanically by anodic oxidation. The anodic oxidation of the aluminium or of the aluminium alloy for passivation and formation of a porous layer can take place in accordance with known methods, using direct and/or alternating current, and using electrolyte baths that are suitable in each case, with the addition, for example, of sulphuric acid, oxalic acid, chromic acid, citric acid or combinations of oxalic acid and chromic acid or sulphuric acid and oxalic acid. Such anodizing techniques are known in the art, examples being the DS process (direct current; sulphuric acid), the DSX process (direct current; sulphuric acid with addition of oxalic acid), the DX process (direct current; oxalic acid), the DX process with addition of chromic acid, the AX process (alternating current; oxalic acid), the AX-DX process (oxalic acid; first alternating current then direct current), the AS process (alternating current; sulphuric acid) and the chromic acid process (direct current; chromic acid). The voltages lie, for example, within the range from 5 to 80 volts, preferably from 8 to 50 volts; the temperatures lie, for example, within the range from 5 to 50° C.; the current density at the anode lies, for example, within the range from 0.3 to 5 A/dm², preferably from 0.5 to 4 A/dm², current densities of just $\leq 2$ A/dm² generally being suitable for producing a porous oxide layer; at higher voltages and current densities, for example, within the range from 100 to 150 volts and $\geq 2$ A/dm², especially from 2 to 3 A/dm², and at temperatures up to 80° C., it is possible to produce particularly hard and fine-pored oxide layers in accordance, for example, with the "Ematal" process with oxalic acid in the presence of titanium salts and zirconium salts. For the production of oxide layers which subsequently are dyed electrolytically or are directly dyed adsorptively with a dye of the formula (I) the voltage, in accordance with a preferred procedure which is customary per se in practice, lies within the range from 12 to 20 volts; the current density in this case is preferably from 1 to 2 A/dm². These anodizing techniques are common knowledge in the art and are also described in detail in the technical literature: for example, in Ullmann's "Enzyklopädie der Technischen Chemie", 4th edition, volume 12, pages 196 to 198, or in the Sandoz brochures "Sanodal®" (Sandoz AG, Basle, Switzerland, publication No. 9083.00.89) or "Ratgeber fur das Adsorptive Farben von Anodisiertem Aluminium" (Sandoz, publication No. 9122.00.80). The thickness of the porous oxide layer lies advantageously within the range from 2 to 35 μm, preferably from 2 to 25 μm. In the case of colour anodization the thickness of the oxide layer amounts advantageously to values within the range from 5 to 60 μm, preferably from 10 to 40 μm. The dyes of the formula (I) are also suitable for thin oxide layers, e.g., those $\leq 10$ μm, and for those which have been anodically dyed. If the anodized aluminium or the anodized aluminium alloy has been stored for a short time (e.g., 1 week or less) prior to dyeing it is advantageous to wet and/or activate the substrate prior to dyeing by means, for example, of treatment with a non-reductive aqueous mineral acid, for example, with sulphuric acid or nitric acid. If desired, the oxide layer—in analogy to the known "Sandalor®" process —can first be electrolytically predyed, for example, in a bronze shade, and then overdyed with a dye of the formula (I); in this way it is possible to obtain particularly muted shades which find a particularly suitable use, for example, in exterior architecture. It is also possible to overdye oxide layers predyed by colour anodization (by the process known as integral dyeing) with a dye of the formula (I); in this way too it is possible to obtain very muted shades which are particularly suitable, for example, for exterior architecture.

To dye the oxide layer with the dyes of the formula (I) it is possible to use dyeing methods which are customary per se, in particular adsorption methods, where the dye solution can be applied, for example, to the oxide surface by means, for example, of spraying or by application with a roller (depending on the shape of the substrate) or, preferably, by immersion of the article to be dyed in a dyebath. In one feature of the dyeing process of the invention the anodized metal articles can, following anodic treatment and rinsing, be treated with the dyebath in the same vessel in which anodizing has taken place, or, in a further feature, the articles to be dyed may, following anodic treatment and rinsing, be removed from the vessel and be dyed, either directly or after drying and any intermediate storage, in a second unit; if the articles have been stored in the interim, it is recommended to carry out activation (for example, by brief treatment with sulphuric and/or nitric acid) prior to dyeing. Regarding this point it is noted that intermediate storage—if carried out at all—is preferably for a limited, short period, for example, less than 1 week, especially $\leq 2$ days. In accordance with generally customary and preferred processes, dying takes place directly after anodizing and subsequent rinsing.

Dyeing takes place judiciously at temperatures below the boiling point of the liquor, advantageously at temperatures within the range from 15 to 80° C., preferably within the range from 20 to 75° C. and, with particular preference, from 20 to 60° C. The pH of the dyeing liquor lies, for example, in the clearly acidic to weakly basic range, for example, in the pH range from 3 to 8, with preference being given to conditions ranging from weakly acidic to nearly neutral, in particular in the pH range from 4 to 6. The dye concentration and the duration of dyeing may vary very greatly depending on the substrate and on the desired colouring effect. Suitable dye concentrations are for example those within the range from 0.01 to 20 g/l, advantageously from 0.1 to 10 g/l and, in particular, from 0.2 to 2 g/l. The dyeing duration may lie, for example, within the range from 20 seconds to 1 hour, advantageously from 5 to 40 minutes, with very fine, intense dyeings being obtainable at a dyeing duration of only from 5 to 30 minutes on oxide layers having a thickness within the range from 5 to 25 $\mu$m at dye concentrations, pH values and temperatures within the preferred ranges. Since the dyes to be employed in accordance with the invention are highly soluble in water it is also possible to use them to prepare stock solutions or reinforcing liquors of any desired concentration, in order to set or correct the dye concentration in the dyebath to whatever level, as required.

Prior to sealing, the dyed substrate is advantageously rinsed with water. Sealing may be carried out using any known methods customary per se, with or without the aid of suitable additives. Sealing may be carried out, for example, in one or two stages, and, if proceeding in two stages, the first stage consists advantageously of treatment with hot water (for example, within the temperature range from 70 to 90° C.). For the second stage (aftersealing or main sealing) or for the single-stage process sealing may be carried out for example by boiling, with deionized water (for example, at temperatures $\geq 95°$ C., at pH values within the range from 5.5 to 6, and for a treatment duration of from 30 to 60 minutes) or a steam treatment can be carried out, for example, at from 4 to 6 bar overpressure. In accordance with a further procedure sealing may be carried out, for example, at pH values within the range from 4.5 to 8, with the aid of metal salts or metal oxides (e.g., nickel acetate or cobalt acetate) or also with chromates, in one stage or two stages. Such sealing with metal compounds (e.g., with nickel acetate) permits particularly effective suppression of dye bleeding. A further procedure operates with the aid of organic sealants, e.g. organic phosphonates and diphosphonates or also water-soluble (cyclo)aliphatic polycarboxylic acids or aromatic ortho-hydroxy carboxylic acids (as described, for example, in DE-A-3327191) at pH values within the range, for example, from 4.5 to 8. The sealants can be employed in very low concentrations: for example, in concentrations from 0.001 to 2 g/l, preferably from 0.002 to 0.1 g/l. The sealing temperature can vary depending on the auxiliary used and on the process chosen; for example, within the range from 20 to 100° C., for hot sealing e.g. within the range from 60 to 100° C., advantageously from 80 to 100° C., for cold sealing e.g. at temperatures within the range from 20 to 30° C., with the possible use of nickel salts or cobalt salts in combination with alkali metal fluorides, e.g., NaF, in particular also for cold sealing, at, for example, 20–30° C. If desired, the dyed and sealed aluminium oxide layers or aluminium alloy oxide layers can subsequently be coated with, for example, waxes, resins, oils, paraffins or plastics, provided that this coating is transparent.

For setting the pH values in the dyebaths and sealing solutions it is possible to use known additives which are customary per se, examples being sulphuric acid, acetic acid, ammonia, sodium hydroxide or sodium carbonate, and/or sodium acetate. If desired or necessary, antismut additives can be used and/or surfactants (e.g., wetting agents), especially anionic surfactants such as $C_{9-14}$-alkanesulphonates, mono- or dialkylbenzenesulphonates in which the alkyl radicals contain a total of 4 to 18 carbon atoms, and oligomeric condensation products of formaldehyde and naphthalenesulphonic acids.

The dyeings obtainable with the dyes of the formula (I) feature very fine, bright yellow shades and are notable for their high levels of fastnesses, especially light fastness, (also light fastness when wet and weathering fastness), especially with those dyes in which R is a radical of the formula (a) and, in particular, in which the formula (a) denotes unsubstituted phenyl.

In the examples which follow the parts signify parts by weight and the percentages signify percentages by weight; the temperatures are indicated in degrees Celsius.

EXAMPLE 1

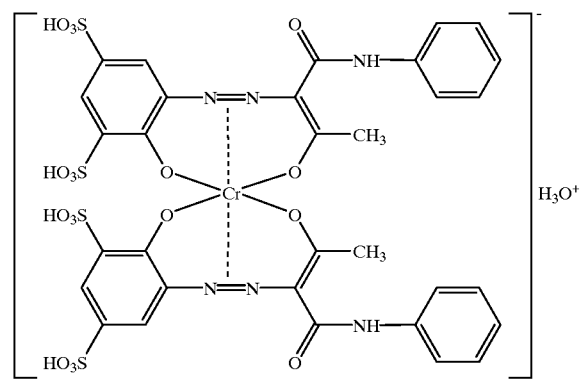

(1)

13.45 g (0.05 mol) of 2-amino-1-hydroxybenzene-4,6-disulphonic acid are placed in 25 ml of water and a pH in the acidic range is set with 3 ml of hydrochloric acid. With ice cooling, 3.5 g (0.0507 mol) of sodium nitrite dissolved in 5 ml of water are added and the mixture is subsequently stirred at between 0° and 10° C. for hours. The excess nitrite is destroyed with a little sulphamic acid. This diazonium salt solution is added dropwise at a temperature between 0° and 10° C. to a solution of 8.86 g (0.05 mol) of acetoacetanilide, 8 g of sodium carbonate and 5 ml of 30% strength sodium hydroxide solution in 30 ml of water to which 30 g of ice are added. Stirring is continued for 4 hours. To this reaction solution there are added 5 ml of formic acid and 0.025 mol of chromium sulphate. The pH is adjusted to 5 to 6 with 7 ml of 30% sodium hydroxide solution and the mixture is boiled for 6 hours. The product is precipitated with potassium chloride and filtered. The chromium complex dye is obtained, in a yield of 90%, in the form of the sodium/potassium salt.

If desired, the dye prepared can be desalinated by membrane filtration.

The maximum light absorption $\lambda_{max}$ of the dye, measured as a solution with a concentration of 22.28 mg/l in 1% strength sodium carbonate solution, is at 465.3 nm. The specific extinction is 26930 cm$^3$/g.

The dyes listed in the following table which, in the form of the free acid, correspond to the following formula (2):

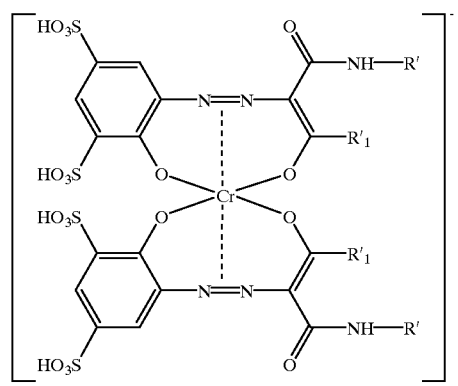

are produced in analogy to the procedure described in Example 1 and are obtained in analogy to Example 1 in the form of their sodium/potassium salts, and give yellow dyeings on anodized aluminium.

TABLE 1

(Examples 2 to 15)

| Example | R' | R'$_1$ |
|---|---|---|
| 2 | ―⟨benzene⟩―SO$_3$H (para) | ―CH$_3$ |
| 3 | ―⟨benzene⟩―SO$_3$H (meta) | ―CH$_3$ |
| 4 | ―⟨benzene with OCH$_3$, SO$_3$H, CH$_3$⟩ | ―CH$_3$ |
| 5 | ―⟨naphthalene⟩―SO$_3$H | ―CH$_3$ |
| 6 | ―⟨naphthalene⟩―SO$_3$H | ―CH$_3$ |
| 7 | ―⟨naphthalene⟩―SO$_3$H | ―CH$_3$ |
| 8 | ―⟨naphthalene with two SO$_3$H⟩ | ―CH$_3$ |
| 9 | ―CH$_2$―CH(C$_2$H$_5$)―CH$_2$―CH$_2$―CH$_2$―CH$_3$ | ―CH$_3$ |
| 10 | ―⟨benzene with OCH$_3$ (ortho)⟩ | ―CH$_3$ |
| 11 | ―⟨cyclohexane⟩H | ―CH$_3$ |
| 12 | ―CH(CH$_3$)―CH$_2$―CH$_3$ | ―CH$_3$ |
| 13 | ―⟨benzene⟩ | ―CH$_2$CH$_3$ |
| 14 | ―⟨benzene⟩―SO$_3$H | ―CH$_2$CH$_2$CH$_3$ |
| 15 | ―⟨naphthalene⟩ | ―CH$_3$ |

Through the use of corresponding bases for neutralization and of corresponding salts for precipitation it is also possible to obtain the dyes of Examples 1 to 15 in the form of their ammonium and/or lithium salts. By acidification, for example, with sulphuric acid, filtration, and neutralization of the acidified dye with triethanolamine, the dyes can be obtained in the corresponding amine salt form.

Application Example A

A degreased and deoxidized workpiece of pure aluminium sheet is anodically oxidized in an aqueous solution which comprises sulphuric acid and aluminium sulphate in a concentration of from 17 to 22% sulphuric acid and from 0.5 to 1.5% aluminium ions, at a temperature of from 18 to 20° C., at a voltage of from 15 to 17 volts with direct current having a density of 1.5 A/dm², for 50 minutes. An oxide layer about 20 μm thick is formed. After rinsing with water, the aluminium sheet workpiece is dyed for 20 minutes at 60° C. in a dyebath containing 1000 parts of deionized water 0.5 part of the chromium complex dye produced according to Example 1, at a pH of from 5.5 to 5.7 (set with acetic acid and sodium acetate). The dyed workpiece is rinsed with water and then sealed in deionized water at from 98 to 100° C. for 60 minutes. To prevent the formation of any disruptive deposit during sealing, an antismut agent can be added to the deionized water that is employed for sealing. A yellow-dyed workpiece is obtained which is notable for its outstanding light fastness and weather fastness.

Application Example B

The procedure described in Application Example A is repeated with the difference that sealing is carried out with a solution which contains 3 parts of nickel acetate in combination with 0.5 part of oligomeric condensate of naphthalenesulphonic acid and formaldehyde in 1000 parts of water. A yellow dyeing of outstanding light fastness and weather fastness is obtained.

Application Example C

The procedure described in Application Example B is repeated with the difference that the dyeing is carried out for 40 minutes at 40° C. instead of 20 minutes at 60° C. A yellow dyeing having excellent light and weather fastness is obtained.

Application Example D

A degreased workpiece made of Peraluman 101 (aluminium alloy with 1% Mg and 0.5% Si) sheet is anodically oxidized in an aqueous solution containing sulphuric acid and aluminium sulphate of a concentration of from 18 to 20% sulphuric acid and from 0.5 to 1.5% aluminium ions, at a temperature of from 18 to 20° C., at a voltage of from 15 to 17 volts with direct current of a density of 1.5 A/dm², for 50–60 minutes. An oxide layer about 22–24 μm thick is formed. After brief rinsing, the anodized aluminium is dyed electrolytically in an aqueous solution of the following components 15 14 20 g/l of tin(II) sulphate 15–20 g/l of sulphuric acid and 25 g/l of a customary commercial tinning bath stabilizer.

The workpiece is left for 2 minutes at 20–25° C. in the solution without exposure to current and then is dyed electrolytically at a voltage of 16 volts. A medium bronze coloration is obtained. After thorough rinsing in running water, the workpiece is dyed at 60° C. for 20 minutes in a dyebath containing in 1000 parts of deionized water 1 part of the chromium complex dye prepared according to Example 1, at a pH of 5.5 (set with acetic acid and sodium acetate). The dyed work-piece is rinsed with water and then sealed at from 98 to 100° C. for 60 minutes in a 0.3% strength aqueous nickel acetate solution whose pH is set to 5.5–6 with acetic acid. A bronze-yellow-dyed workpiece is obtained which is notable for its outstanding light fastness and weather fastness.

Analogously to the dye according to Example 1, the dyes of each of Examples 2 to 15 are employed in Application Examples A, B, C and D. The methods of Application Examples A, B and C give yellow dyeings and the method of Application Example D gives bronze-yellow to bronze-brown dyeings, which are notable for their light fastness and weather fastness.

The light fastness may be determined in accordance with ISO Standards, for example in accordance with ISO Standard No. 2135–1984, by dry exposure of a sample in exposure cycles of 200 hours each of standard light exposure in an Atlas Weather-O-meter 65 WRC, which is fitted with a xenon arc lamp, or in accordance with ISO Standard No. 105 B02 (USA) by dry exposure of a sample in exposure cycles of 100 hours each of standard light exposure in an Atlas Weather-O-meter Ci 35 A, which is fitted with a xenon arc lamp, and comparison of the exposed samples with a rating sample of light fastness rating=6 on the blue scale (corresponding to a rating of about 3 on the grey scale) or directly with the blue scale original of rating 6. If a light fastness value corresponding to the rating 6 on the blue scale is achieved after only 2 exposure cycles, the sample is evaluated as having a light fastness rating =7; if this point is not reached until after 4 cycles, the accorded a fastness rating of 8, and so on, in Table 2 below.

TABLE 2

| Exposure cycle | Exposure time | | Light fastness rating |
|---|---|---|---|
| | 65 WRC | Ci 35 A | |
| 1 | 200 hours | 100 hours | 6 |
| 2 | 400 hours | 200 hours | 7 |
| 4 | 800 hours | 400 hours | 8 |
| 8 | 1600 hours | 800 hours | 9 |
| 16 | 3200 hours | 1600 hours | 10 |

After 8 exposure cycles all of the dyeings obtained dyes of Examples 1–15 in accordance with Application Examples A, B, C and D are unchanged while the dyeings obtained in comparison using the dye from Example 10 of CH-A 396256 analogously to Application Examples B and C had faded after only the first exposure cycle (corresponding to a light fastness rating of 1).

What is claimed is:

1. 1:2 chromium complex dyes of the formula:

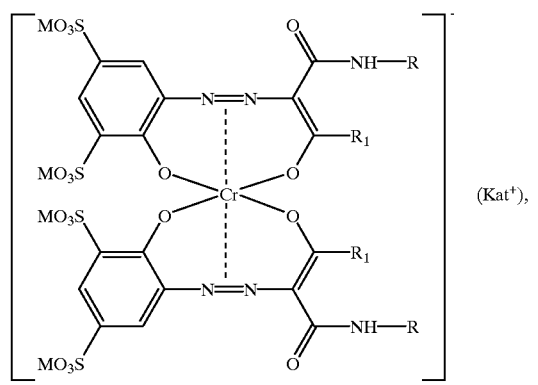

in which R signifies $C_{1-9}$-alkyl or a radical of the formula:

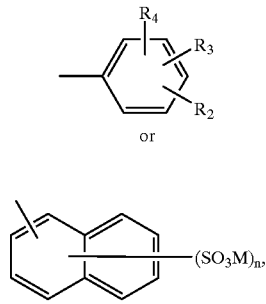

(a)

or (b)

$R_1$ signifies $C_{1-4}$-alkyl, $R_2$ signifies hydrogen or —$SO_3M$, $R_3$ signifies hydrogen, methyl or methoxy, $R_4$ signifies hydrogen, methyl, methoxy or chloro, n signifies from 0 to 3, M signifies hydrogen or a non-chromophoric cation and Kat$^+$ signifies hydrogen or a non-chromophoric cation.

2. 1:2 chromium complex dyes of the formula (I) according to claim 1, in which

R signifies $C_{4-8}$-isoalkyl, cyclohexyl optionally substituted with 1-3 methyl groups, 4- or 5-sulpho-1-naphthyl or a radical of the formula (a), $R_1$ signifies methyl, $R_2$ signifies hydrogen or —$SO_3M$, $R_3$ signifies hydrogen, $R_4$ signifies hydrogen, M signifies hydrogen or an ammonium or alkali metal cation and Kat$^+$ signifies hydrogen or an ammonium or alkali metal cation.

3. Process for the production of the 1:2 chromium complex dyes according to claim 1, characterized in that at least one metallizable compound which corresponds in one of its tautomeric forms to the formula:

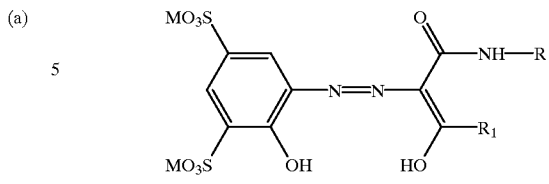

(II)

is reacted with a chromium donor compound.

4. Dye compositions containing a dye of the formula (I) according to claim 1 and a second component selected from the group of extenders, further additives and combinations thereof.

5. Dye composition according to claim 4, which is an aqueous concentrated solution of a dye of the formula (I) or is a dry granular product.

6. A method of dyeing artificially produced oxide layers on aluminium and aluminium alloys by applying dyes of the formula (I) according to claim 1 to said artificially produced oxide layers.

7. A method of dyeing artificially produced oxide layers on aluminium and aluminium alloys according to claim 6 where the oxide layers on the aluminium are produced by anodization of the aluminium and where the oxide layers on aluminium alloys are produced by anodization of the aluminium alloys.

8. A method of dyeing artificially produced oxide layers on aluminium and aluminium alloys according to claim 7, where the oxide layers are anodically dyed prior to dyeing with the dyes of formula (I).

9. A method of dyeing artificially produced oxide layers on aluminium and aluminium alloys according to claim 6, where said artificially produced oxide layers are porous and where after dyeing with dyes of formula (I), the porous dyed oxide layers are sealed.

10. Oxide layers dyed by the process according to claim 6.

11. A method of dyeing an artificially produced oxide layers on aluminium and aluminium alloys by applying dye compositions of the formula (I) according to claim 4 to said artificially produced oxide layers.

12. A method of dyeing an artificially produced oxide layers on aluminium and aluminium alloys by applying dye compositions of the formula (I) according to claim 5 to said artificially produced oxide layers.

* * * * *